UNITED STATES PATENT OFFICE.

ALBRECHT THIELE, OF BERLIN, GERMANY, ASSIGNOR TO CHEMISCHE FABRIK AUF ACTIEN, (VORM. E. SCHERING), OF BERLIN, GERMANY.

PHARMACEUTICAL COMPOUNDS.

1,185,265.  Specification of Letters Patent.  Patented May 30, 1916.

No Drawing.  Application filed July 3, 1913. Serial No. 777,303.

*To all whom it may concern:*

Be it known that I, ALBRECHT THIELE, doctor of philosophy, chemist, citizen of the German Empire, residing at Berlin, Germany, have invented a new and useful Improvement in Pharmaceutical Compounds, of which the following is a specification.

The present invention relates to the manufacture of the hitherto unknown condensation products of piperonal, pyroracemic acid and derivatives from anilin, these products being the 2-piperonylquinolin-4-carboxylic acid substituted in the benzol nucleus, the molecule of which contains the following atomic group:

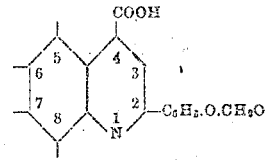

The new products are insoluble in water and have proved to be valuable analgetics, an average dose being from ½ to 1 gram. They may be used as such or in the salt form.

The compounds can, for instance, be obtained as follows, the parts being by weight:

(1) 106 parts of paratoluidin are boiled in a vessel with reflux condenser for several hours with 150 parts of piperonal and 88 parts of pyroracemic acid in alcoholic solution. The 6-methyl-2-piperonylquinolin-4-carboxylic acid separates out and is purified through its sodium salt. It melts at about 246–247° centigrade and is insoluble in water, soluble in hot alcohol and has the following structural formula:

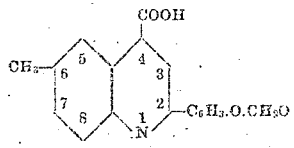

(2) 110 parts paraminophenol are boiled for some time with 150 parts piperonal and 88 parts pyroracemic acid in alcoholic solution. The precipitated 6-oxy-2-piperonylquinolin-4-carboxylic acid is purified through its sodium salt; it is insoluble in water and soluble in alcohol and does not melt at 300 centigrades.

(3) 140 parts orthoanisidin are boiled for several hours with 150 parts piperonal and 90 parts pyroracemic acid. The precipitated 8-methoxy-2-piperonylquinolin-4-carboxylic acid is twice precipitated out of its alkaline solution by means of an acid and recrystallized out of 40 per cent. alcohol. The compound has a melting point of 114–115° centigrade and is insoluble in water but soluble in alcohol.

I claim as my invention:—

1. As new products, the 2-piperonylquinolin-4-carboxylic acid substituted in the benzol nucleus, the molecule of which contains the following atomic group:

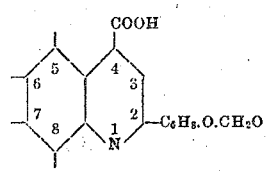

said products being the condensation products of piperonal, pyroracemic acid and derivatives from anilin, such products being insoluble in water, forming salts and having analgetic properties, substantially as described.

2. As a new product the 6-methyl-2-piperonylquinolin-4-carboxylic acid of the formula

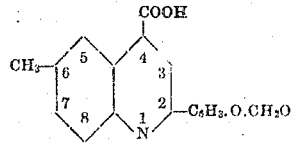

melting at about 246–247° centigrade, being insoluble in water, soluble in hot alcohol and forming salts, substantially as described.

In testimony whereof I have hereunto set my hand in the presence of two subscribing witnesses.

ALBRECHT THIELE.

Witnesses:
  HENRY HASPER,
  WOLDEMAR HAUPT.